May 28, 1929.  A. J. F. J. COUSIN  1,714,767
PROCESS FOR THE REDUCTION OF METALLIC OXIDES
Filed March 14, 1923
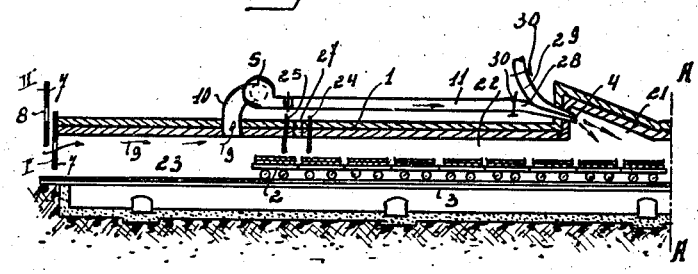
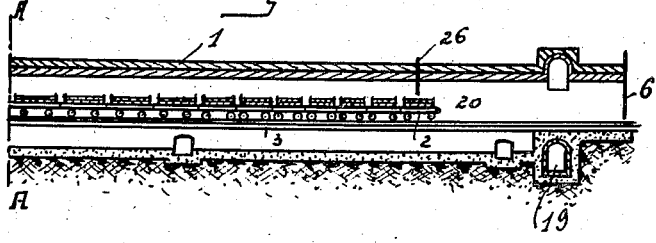
Inventor:
Arthur J. F. J. Cousin
by
Victor D. Borst
Atty.

Patented May 28, 1929.

1,714,767

UNITED STATES PATENT OFFICE.

ARTHUR JULES FRANÇOIS JOSEPH COUSIN, OF JEMEPPE SUR MEUSE, BELGIUM, ASSIGNOR TO THE SOCIÉTÉ ANONYME JOHN COCKERILL, OF SERAING, BELGIUM.

PROCESS FOR THE REDUCTION OF METALLIC OXIDES.

Application filed March 14, 1923, Serial No. 624,945, and in Belgium May 18, 1922.

This invention relates to a process for the reduction, purification and agglomeration of metallic oxides of relatively heavy non-volatile metals such as, for example, iron and copper. It has for its object to eliminate the volatile impurities contained in the oxidized ores, such as arsenic for example, and to bring the metal such as iron or copper which it is desired to obtain into a form suitable for subsequent treatment in a blast furnace or open hearth furnace, say that of an agglomerated product. It is more particularly applicable to the treatment of iron ores but in the case of copper or other ores the principles to be observed remain the same, only the temperatures employed will have to be varied according to the nature of the metal to be obtained.

Many processes of direct reduction known up to the present time have this characteristic in common that the reduction of the ore is obtained by the chemical action of the fuel which is at the same time the source of heat which renders the reaction possible.

The process which forms the subject matter of the present invention is distinguished from those processes already known by the fact that the reducing agent is, in effect, substantially independent of the fuel which furnishes the heat. In this respect it is characterized essentially by the fact that the deoxidizing action is produced by the contact or the intimate mixture of the ore and the reducing agent at a temperature which does not reach that of fusion and also by the use of a neutral flame, that is to say one which is neither oxidizing nor reducing, in the presence of an atmosphere having no oxidizing effect upon the solid metal at the temperatures which prevail in the working chambers of the furnace used.

In carrying out the invention practically this intimate contact of the metallic oxides to be treated and of the reducing agent (carbon) is effected preferably, by compression of the reacting material, previously ground and moistened, so as to produce expulsion of the occluded air, the least traces of which disappear by reason of the water with which the mixture has been impregnated before compression. The use of pressure, after the air has been expelled and replaced by the water, forces the particles of carbon and metallic oxide into a close intimate contact, ensuring a reduction which is further facilitated by the fact that the carbonic oxide which forms in the heart of the mass is itself a reducing agent.

The application of the process does not require any special material or plant. Any furnace will do to carry out the process provided that the supply of air which supports combustion can be controlled therein in such a way as to avoid any excess of air beyond the quantity necessary to ensure perfect combustion and in general, effect the regulation in such a way that the atmosphere in which the operation is carried out can be kept in a neutral state relatively to the metal in treatment, a condition readily realized by preventing any reentrance of external air into the furnace.

The condition of perfect combustion excludes the use of ordinary solid fuels. The combustible must be gaseous, liquid or pulverulent (powdered coal) used by means of one or other of the well known systems of burners, provided that the regulation of the air can be graduated with precision. The temperature of the furnace must not exceed that which is sufficient to ensure the reduction of the ore without causing fusion and if iron is the metal treated it must lie between the limits of 900° and 1360° C.

By way of example the process may be carried out in the following manner:

The ores or metallic oxides to be reduced are powdered and mixed intimately with the reducing agent, which is also powdered and may consist of coal dust, coke sawdust or any other reducing substance procurable at a low price. This powdered mixture contains air, the effect of which is to hinder reduction by offering resistance to the intimate contact of the particles of ore and carbon. Also such contained air would impede reduction by causing partial reoxidation, thereby both delaying the reduction and increasing the consumption of fuel. The air is now expelled from the mixture by substantially saturating the latter with water, which displaces the air from the interstices between the minute particles of the finely comminuted material, such air being replaced by the substituted water. Intimate molecular contact of the particles is now brought about by subjecting the substantially airless water-containing mixture to great pressure. This results in compression which, by reason of the contained water, expels residual or remaining air, if any. Also it integrates the mixture into a solid mass which is substantially free from any trapped or occluded air. Thus the mixture may have imparted to it, for example, the form of briquettes. The mixture when brought into this form is introduced into the working chamber of the furnace where it is exposed to the necessary temperature and is withdrawn from all chemical action other than that of the reducing agent. When the entire mass has attained the temperature of reduction, which is a special one for each particular case, the flame is extinguished. The reaction continues and is completed in the atmosphere of the furnace which is kept neutral until cooling down has rendered all danger of reoxidation impossible.

The reduced metal is obtained in a form of a metallic sponge, which only contains as impurities non-volatile substances such as silica, alumina and lime principally which can be eliminated by grinding, electric separation, or by fusion in a blast furnace if iron be the metal dealt with. The volatile impurities are eliminated directly by the heat of the furnace. It is thus possible to treat minerals containing arsenic which have hitherto been considered unfit for metallurgical uses.

In order to understand this invention clearly a more detail description will now be given in connection with Figs. 1 and 2 of the drawing, which drawing illustrates, as an example, the details of a furnace which may be used advantageously for the practice of this process.

Figs. 1 and 2 represent a longitudinal section of the furnace the part thereof shown in Fig. 2 forming a continuation of the part shown in Fig. 1 and connected at the line A—A.

In the drawing 1 is the furnace forming a tunnel in which a train of trucks 2, travelling along a track 3 carries the compressed mixture of ore and reducing agent which is submitted to the action of burners 4. The air to support combustion is supplied by a blower 5. The furnace is provided at the truck inlet end with a door 6 and at the truck outlet end with a damper 7 through the adjustable opening 8 of which the air to support combustion enters. After having passed for a certain distance in the direction of the arrows 9, the air is drawn into the conduit 10 by the blower 5 which forces it to the burners through the conduit 11.

The furnace is divided along its length into different zones or chambers each having its own special function.

The first zone 20 comprised between the door 6 for the entrance of the trucks 2 and the reaction chamber 21 is the zone of preparation. It is into this zone that the flue 19 leading to the chimney opens.

The second zone called the zone of reaction is composed of a chamber 21 into which the burners 4 penetrate, the flames from which are projected directly on to the material to be treated.

A third zone or zone of cooling completes the furnace. This zone extends between the reaction chamber 21 and the damper 7 and is divided into two sections 22 and 23 by dampers 24 and 25 the function of which is to isolate the section 22 thus cutting it off from the action of the blower 5.

In the normal operation the train of trucks 2 connected to each other occupies the whole length of the furnace. The thrust which causes one truck to enter the furnace causes another to emerge from the opposite end. The furnace therefore always contains the same number of trucks. A damper 26 placed in the zone of preparation 20 is adjusted in such a way as to always be as near as possible to the train of trucks and yet leave sufficient draught to prevent the creation of any pressure in the reaction chamber 21, but at the same time avoiding any reduction of pressure below atmospheric pressure. The function of this damper 26 is therefore to maintain as much as possible a null pressure in the reaction chamber 21.

The material carried by the trucks therefore becomes gradually heated up by contact with the burnt gases which are inert and still hot which fill the zone of preparation 20, and the material already at a high temperature is passed into the reaction chamber 21.

In this chamber the action of the burners 4 can be regulated at will. Each burner having an air supply pipe 28 and a supply pipe 29 for gas or other fuel and each pipe being provided with its own regulating valve 30, the combustion may be conducted so as to give the required neutral flame.

In the cooling zone 22, the material while still hot is in a neutral atmosphere without any appreciable pressure and is subjected to the reaction of the materials in contact e. g. metallic oxides and carbon, which reaction takes place in consequence of the elevation of the temperature. This reaction in the case of iron oxide is endothermic and causes rapid cooling down to a temperature at which no reaction can take place. At this moment the material may be passed into the second zone of cooling 23 where it gives up the remainder of its heat to the air to support combustion and which circulates in the direction of the arrows 9, that is to say, in the reverse direction to that in which the material travels. This latter when completely treated emerges finally through the door 7.

The separation of the cooling zone into two sections 22 and 23 is for the purpose of preventing certain disadvantages, the chief one of which is the drawing in of flames or burnt gases by the blower 5 with as a consequence the blowing in to the combustion chamber 21 of air laden with carbon dioxide; on the other hand in the case of a reduction of pressure below atmospheric pressure in the reaction chamber 21 the air might be drawn in in too great a volume, which might cause cooling of the flame and a general disturbance in the working of the furnace.

These accidents cannot occur as long as the pressure in section 23 of the cooling zone remains null or thereabouts. This is obtained by the working of the two dampers 24 and 25 between which there is an opening 27 pierced in the arch or crown of the furnace.

The two dampers 24 and 25 are always lowered as much as possible so as to just touch the surface of the trucks as they pass through. The closing thus obtained is not however hermetic and the air can in case there is any pressure formed in the chamber 22 escape through the opening 27 thus bringing back the pressure to the limits within which its effect is not harmful. The zone 22 is therefore a zone in which the same atmosphere can be maintained as in the reaction chamber.

Further details of a furnace which may be used advantageously for the practice of this process are disclosed and claimed in my co-pending application for patent, Serial No. 624,946, filed simultaneously with this application now issued as Patent No. 1,540,205.

What I claim is:

1. The process for the reduction of metallic oxides of relatively heavy non-volatile metals comprising finely comminuting the metallic oxide, separately finely comminuting a reducing agent, thoroughly mixing such comminuted materials together to obtain a substantially uniform mixture thereof, introducing into said mixture a sufficient quantity of water to fill the interstices between the particles thereof for thereby displacing the air therefrom substantially completely and replacing it with water, then compressing the substantially airless saturated mixture to expel any remnants of residual air and to bring the particles of the metallic oxide and of the reducing agent into intimate contact, and thereafter subjecting the said compressed water-containing mixture to the action of a neutral flame at a temperature sufficient to produce a reducing reaction but below that of fusion of the metal in a neutral atmosphere having no oxidizing effect on the solid metal at the temperature of treatment.

2. The process for the reduction of metallic oxides of relatively heavy non-volatile metals comprising finely comminuting the metallic oxide, separately finely comminuting a reducing agent, thoroughly mixing such comminuted materials together to obtain a substantially uniform mixture thereof, introducing into said mixture a sufficient quantity of water to fill the interstices between the particles thereof for thereby displacing the air therefrom substantially completely and replacing it with water, then compressing the saturated substantially airless mixture for expelling remnants of residual air and for bringing the particles of the metallic oxide and of the reducing agent into intimate contact while at the same time integrating the compressed mixture into briquettes, subjecting these water-containing briquettes to the action of a neutral flame until they are brought to the temperature of reduction of the metallic oxide without fusion of the solid metal, then stopping the action of the flame, and finally completing the reduction in a neutral atmosphere having no oxidizing effect on the solid metal at the temperature of treatment while the temperature to which such briquettes are exposed is gradually decreased until the briquettes have cooled to a temperature below that at which reoxidization is possible.

In testimony whereof I have affixed my signature.

ARTHUR JULES FRANÇOIS JOSEPH COUSIN.